United States Patent
Wang et al.

(10) Patent No.: US 7,228,852 B1
(45) Date of Patent: Jun. 12, 2007

(54) QUICK EGR FLOW RESTRICTION TEST BASED ON COMPENSATED MASS FLOW DIFFERENTIAL

(75) Inventors: Wenbo Wang, Novi, MI (US); Kurt D. McLain, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 8 days.

(21) Appl. No.: 11/289,946

(22) Filed: Nov. 30, 2005

(51) Int. Cl.
*F02M 25/07* (2006.01)
*F02B 47/08* (2006.01)
*G01M 15/00* (2006.01)

(52) U.S. Cl. .................. 123/568.15; 73/118.1; 701/108

(58) Field of Classification Search ........... 123/568.11, 123/568.16, 568.21; 73/117.3, 118.1, 118.2; 701/108
See application file for complete search history.

(56) References Cited

U.S. PATENT DOCUMENTS

| | | | | |
|---|---|---|---|---|
| 5,257,534 A | * | 11/1993 | Azuma et al. | 73/118.1 |
| 5,257,610 A | * | 11/1993 | Ohuchi | 123/568.16 |
| 5,488,938 A | * | 2/1996 | Ohuchi | 123/568.16 |
| 5,675,080 A | * | 10/1997 | Wada | 73/118.1 |
| 7,100,586 B2 | * | 9/2006 | Matsumoto | 123/568.16 |

* cited by examiner

*Primary Examiner*—Willis R. Wolfe, Jr.
(74) *Attorney, Agent, or Firm*—Christopher DeVries

(57) ABSTRACT

An engine control system that monitors flow restriction through an exhaust gas recirculation (EGR) system of an engine includes a first module that calculates a test EGR mass flow rate based on a first average EGR mass flow rate when the EGR system is in an EGR OFF mode and a second average EGR mass flow rate when the EGR system is in an EGR ON mode. A second module selectively generates a fault signal based on the test EGR mass flow rate.

20 Claims, 4 Drawing Sheets

QUICK EGR FLOW RESTRICTION TEST BASED ON COMPENSATED MASS FLOW DIFFERENTIAL

FIELD OF THE INVENTION

The present invention relates to exhaust gas recirculation (EGR) systems for internal combustion engines, and more particularly to a flow restriction test for an EGR system.

BACKGROUND OF THE INVENTION

Internal combustion engines combust an air and fuel mixture within cylinders to reciprocally drive pistons within the cylinders. The pistons rotatably drive a crankshaft to provide drive torque to a powertrain. Exhaust generated by the combustion process is exhausted from the engine through an exhaust manifold, is treated in an exhaust system and is released to atmosphere.

Engine systems often include an exhaust gas recirculation (EGR) system to reduce engine emissions. EGR involves re-circulating exhaust gases back into the cylinders, which limits the amount of oxygen available for combustion and lowers cylinder temperatures. EGR enables ignition timing to remain at an optimum point, which improves fuel economy and/or performance. However, debris build-up within the EGR system restricts exhaust flow therethrough and minimizes the effectiveness of the EGR system.

A traditional method of monitoring the flow restriction through the EGR system is to determine a peak manifold absolute pressure (MAP) difference between MAP levels when the EGR is ON and when the EGR is OFF. This method provides distinct disadvantages in that the MAP difference can have high variation under different engine operating conditions and it is difficult to calibrate compensation factors for the various engine operating conditions. Further, the MAP difference can be contributed to other factors that are independent of the EGR system.

SUMMARY OF THE INVENTION

Accordingly, the present invention provides an engine control system that monitors flow restriction through an exhaust gas recirculation (EGR) system of an engine. The engine control system includes a first module that calculates a test EGR mass flow rate based on a first average EGR mass flow rate when the EGR system is in an EGR OFF mode and a second average EGR mass flow rate when the EGR system is in an EGR ON mode. A second module selectively generates a fault signal based on the test EGR mass flow rate.

In another feature, the second module generates the fault signal when the test EGR mass flow rate is below a threshold EGR mass flow rate.

In other features, the first module monitors a manifold absolute pressure, an engine speed, a manifold temperature, a mass air flow into an intake manifold and a mass air flow into cylinders during operation of the engine in the EGR OFF mode and calculates the first average EGR mass flow rate based thereon. The first module calculates the first average EGR mass flow rate based on averages of the manifold absolute pressure, the engine speed, the manifold temperature, the mass air flow into the intake manifold and the mass air flow into the cylinders over operation of the engine in the EGR OFF mode.

In still other features, the first module monitors a manifold absolute pressure, an engine speed, a manifold temperature, a mass air flow into the intake manifold and a mass air flow into the cylinders during operation of the engine in the EGR ON mode and calculates the second average EGR mass flow rate based thereon. The first module calculates the second average EGR mass flow rate based on averages of the manifold absolute pressure, the engine speed, the manifold temperature, the mass air flow into the intake manifold and the mass air flow into the cylinders over operation of the engine in the EGR ON mode.

In still another feature, the engine control system further includes an enable module that selectively generates an enable signal. The first module calculates the first and second average EGR mass flow rates based on the enable signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
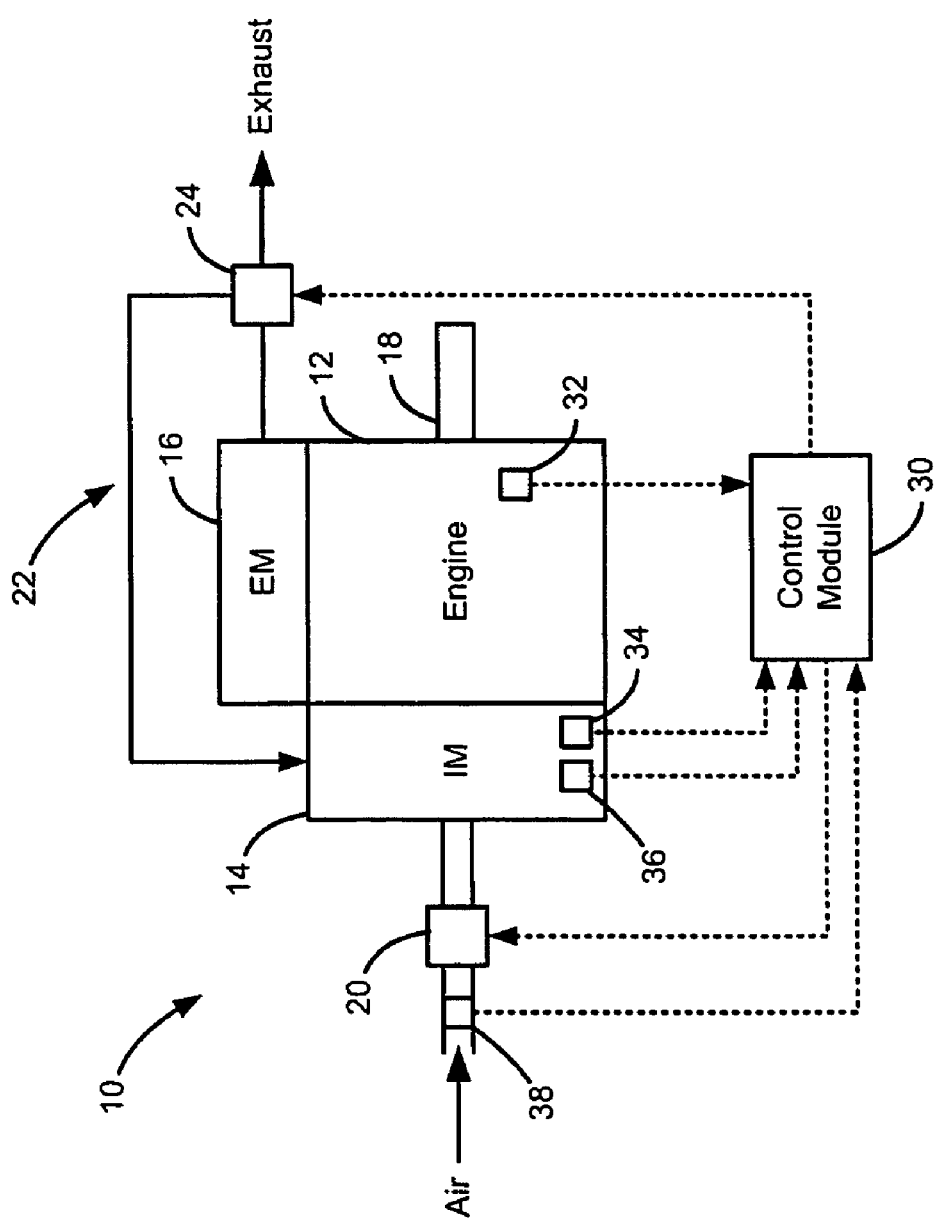
FIG. 1 is a schematic illustration of an exemplary engine system including an EGR system.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary engine system 10 is illustrated. The engine system 10 includes an engine 12, an intake manifold 14 and an exhaust manifold 16. The engine 12 combusts an air and fuel mixture within cylinders (not shown) to drive pistons (not shown) that rotatably drive a crankshaft 18. Air is drawn through a throttle 20 and into the intake manifold 14, which distributes air to the cylinders. Exhaust from the combustion process is exhausted from the cylinders and into the exhaust manifold 16. The exhaust is treated in an exhaust system (not shown) and is released to atmosphere.

The engine system 10 further includes an exhaust gas recirculation (EGR) system 22 having an EGR valve 24. The EGR valve 24 is selectively actuated to re-direct a portion of the exhaust gas back into the intake manifold 14. The EGR system 22 operates in one of an EGR ON mode and an EGR OFF mode. In the EGR OFF mode, the EGR valve 24 is closed and no exhaust gas is circulated back into the intake manifold 14. In the EGR ON mode, the EGR valve 24 is open and a portion of the exhaust gas is circulated back into the intake manifold 14.

A control module 30 regulates engine operation and executes the EGR flow restriction control of the present invention. An engine speed sensor 32 is responsive to engine speed (RPM) and generates an RPM signal based thereon. A manifold absolute pressure ($P_m$) sensor 34 is responsive to the pressure within the intake manifold and generates a $P_m$ signal based thereon. Similarly, an intake manifold temperature sensor 36 is responsive to the temperature within the intake manifold ($T_m$) and generates a $T_m$ signal based thereon. A mass air flow ($\dot{M}_{MAF}$) sensor 38 is responsive to the mass air flow into the intake manifold 14 and generates a $\dot{M}_{MAF}$ signal based thereon. As discussed in further detail below, the control module 30 receives the RPM signal, the $P_m$ signal, the $T_m$ signal and the $\dot{M}_{MAF}$ signal, and executes the EGR flow restriction control based thereon.

The EGR flow restriction control of the present invention determines an average or test EGR mass flow rate ($\overline{\dot{M}}_{EGR}$) based on the difference between an average EGR ON mass flow rate ($\overline{\dot{M}}_{EGRON}$) and an average EGR OFF mass flow rate ($\overline{\dot{M}}_{EGROFF}$). More specifically, an intake manifold mass air flow ($\dot{M}_m$) is determined from the following gas equation of state:

$$\dot{M}_m = \frac{P_m \dot{V}_m}{RT_m} = K\frac{P_m \cdot RPM}{T_m} \quad (1)$$

where:

$\dot{V}_m$ is the intake manifold volumetric flow rate;

K is a constant; and

R is the gas constant.

Based on the Mass Balance Principle, a continuous equation for the intake manifold while the EGR is ON is provided as:

$$\frac{d}{dt}\left(\frac{P_m V_m}{RT_m}\right) = \dot{M}_{MAF} + \dot{M}_{EGR} - \dot{M}_{CylAir} \text{ or} \quad (2)$$

$$\dot{M}_m - \dot{M}_{REF} = \dot{M}_{MAF} + \dot{M}_{EGR} - \dot{M}_{CylAir} \quad (3)$$

where: $\dot{M}_{REF}$ is a reference flow at steady-state; and $\dot{M}_{CylAir}$ is the total mass air flow into all of the cylinders.

Similarly, when the EGR is OFF, a continuous equation for the intake manifold is provided as:

$$\frac{d}{dt}\left(\frac{P_m V_m}{RT_m}\right) = \dot{M}_{MAF} - \dot{M}_{CylAir} \text{ or} \quad (4)$$

$$\dot{M}_m - \dot{M}_{REF} = \dot{M}_{MAF} - \dot{M}_{CylAir} \quad (5)$$

$\dot{M}_{CylAir}$ is equal to $\dot{M}_{MAF}$ during steady-state engine operation. It is also anticipated that $\dot{M}_{CylAir}$ can be calculated based on $\dot{M}_{MAF}$, $P_m$, $T_m$, a throttle position and the number of cylinders, as disclosed in commonly assigned U.S. Pat. No. 5,270,935 entitled Engine with Prediction/Estimation Air Flow Determination and issued on Dec. 14, 1993, the disclosure of which is expressly incorporated herein by reference.

Assuming that $\dot{M}_{REF}$ is the same for a specified monitoring condition, $\overline{\dot{M}}_{EGR}$ for the monitoring periods (i.e., EGR ON and EGR OFF) is provided as:

$$\overline{\dot{M}}_{EGR} = \left[K\frac{\overline{P}_m \cdot \overline{RPM}}{\overline{T}_m} - \overline{\dot{M}}_{MAF} + \overline{\dot{M}}_{CylAir}\right]_{EGR\_ON} - \left[K\frac{\overline{P}_m \cdot \overline{RPM}}{\overline{T}_m} - \overline{\dot{M}}_{MAF} + \overline{\dot{M}}_{CylAir}\right]_{EGR\_OFF} \quad (6)$$

where:

$\overline{\dot{M}}_{EGR}$ is the average $\dot{M}_{EGR}$ over the monitoring period;

$\overline{P}_m$ is the average $P_m$ over the monitoring period;

$\overline{RPM}$ is the average RPM over the monitoring period;

$\overline{T}_m$ is the average $T_m$ over the monitoring period;

$\overline{\dot{M}}_{MAF}$ is the average $\dot{M}_{MAF}$ over the monitoring period; and $\overline{\dot{M}}_{CylAir}$ is the average $\dot{M}_{CylAir}$ over the monitoring period.

Figure 2:
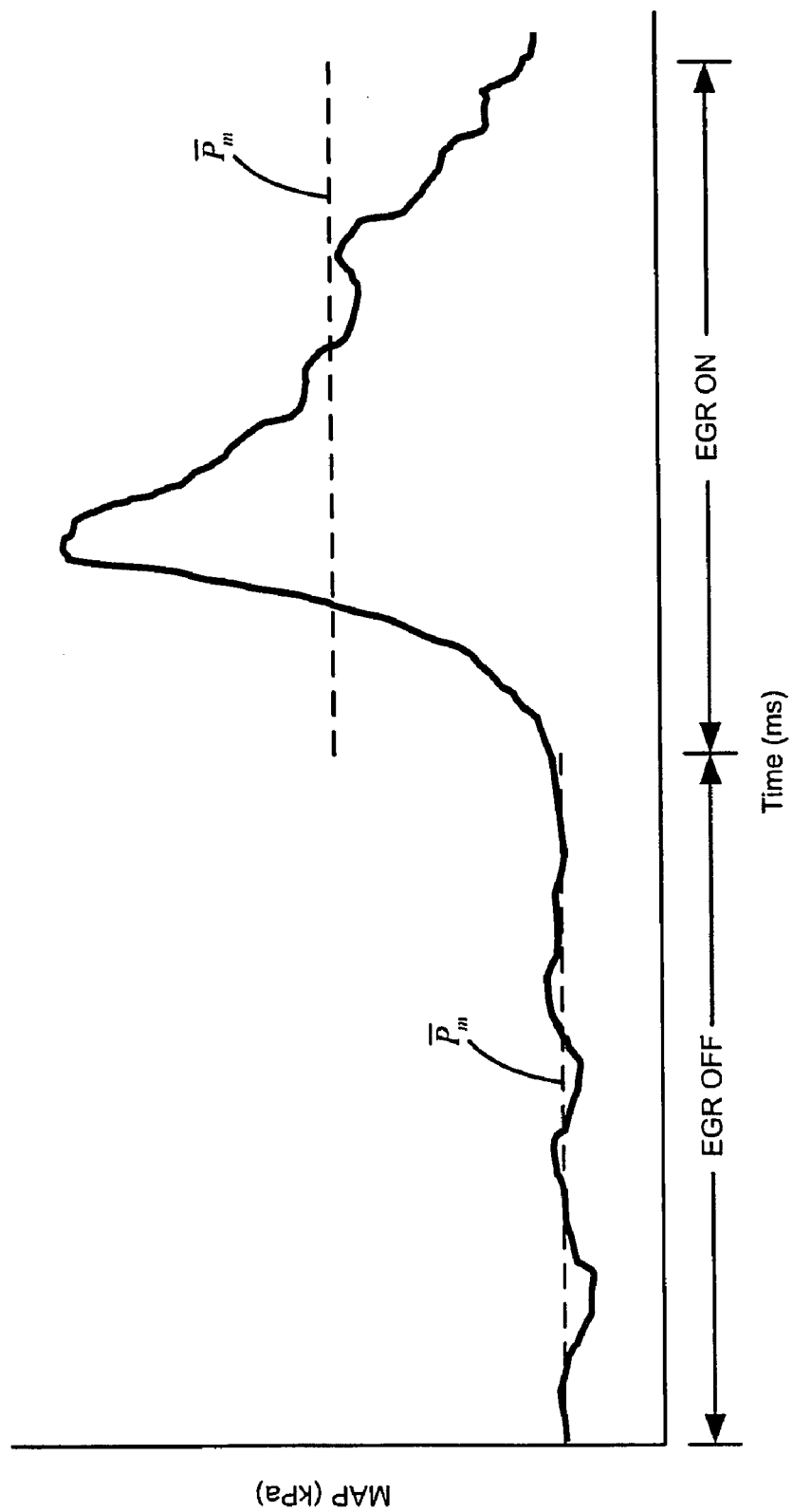
FIG. 2 is a graph illustrating exemplary manifold absolute pressure (MAP) values for EGR ON and EGR OFF conditions.

FIG. 2 is a graph that illustrates exemplary $\overline{P}_m$ values for EGR ON and EGR OFF monitoring periods. The phantom lines illustrate $\overline{P}_m$ for the EGR OFF and EGR ON monitoring periods, respectively.

The EGR flow restriction control of the present invention is a diagnostic test that runs when enable conditions have been met. Exemplary enable conditions include, but are not limited to, deceleration, throttle closed and engine RPM within a predetermined range. If the enable conditions are met, the EGR flow restriction control turns the EGR ON (i.e., EGR valve is open) for a first time period (e.g., 500 ms). The EGR flow restriction control monitors $P_m$, RPM, $T_m$ and $\dot{M}_{MAF}$ over the first time period and determines their respective averages $\overline{P}_m$, $\overline{RPM}$, $\overline{T}_m$ and $\overline{\dot{M}}_{MAF}$. The EGR flow restriction control then turns the EGR OFF (i.e., EGR valve is closed) for a second time period (e.g., 500 ms). The EGR flow restriction test control monitors $P_m$, RPM, $T_m$ and $\dot{M}_{MAF}$ over the second time period and determines their respective averages $\overline{P}_m$, $\overline{RPM}$, $\overline{T}_m$ and $\overline{\dot{M}}_{MAF}$.

The EGR flow restriction test control determines $\overline{\dot{M}}_{EGR}$ based on the average values and the equations described above. $\overline{\dot{M}}_{EGR}$ is filtered (e.g., using an exponentially weighted moving average (EWMA) or a first order lag filter) to reduce the impact of noise to provide $\overline{\dot{M}}_{EGRFILT}$. If $\overline{\dot{M}}_{EGRFILT}$ is less than a threshold value ($\overline{\dot{M}}_{EGRTHR}$), a fault is signaled. In this manner, a single incident of $\overline{\dot{M}}_{EGRFILT}$ being greater than $\overline{\dot{M}}_{EGRTHR}$ may not trigger a fault. If $\overline{\dot{M}}_{EGRFILT}$ is not less than $\overline{\dot{M}}_{EGRTHR}$, a pass is signaled.

Figure 3:
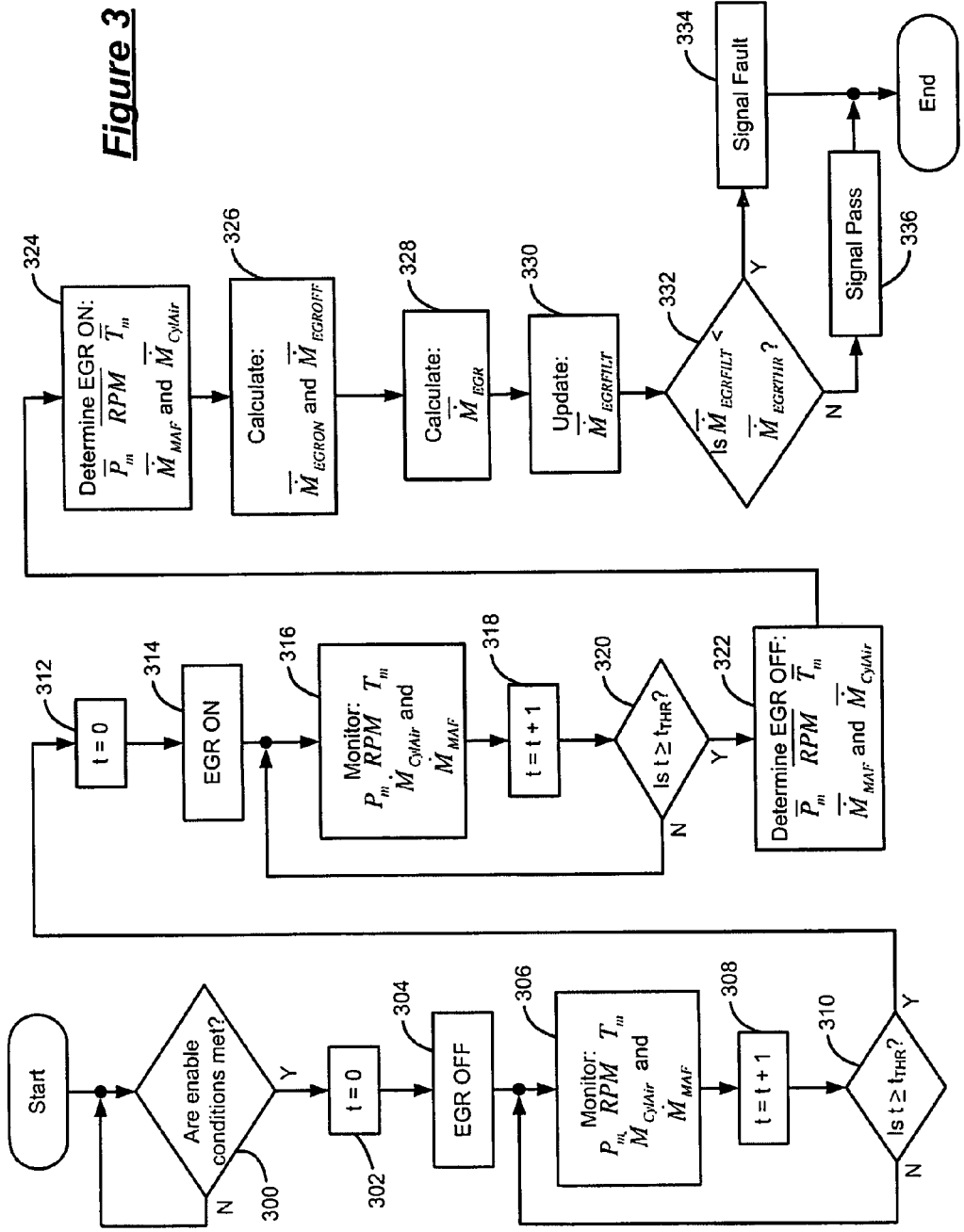
FIG. 3 is a flowchart illustrating exemplary steps executed by the EGR flow restriction control according to the present invention.

Referring now to FIG. 3, exemplary steps executed by the EGR flow restriction test control will be described in detail.

In step 300, control determines whether the enable conditions are met. If the enable conditions are not met, control loops back. If the enable conditions are met, control sets a timer (t) equal to zero in step 302. In step 304, control sets the EGR mode to OFF. In step 306, control monitors $P_m$, RPM, $T_m$, $\dot{M}_{MAF}$ and $\dot{M}_{CylAir}$. Control increments t in step 308. In step 310, control determines whether t is equal to or greater than a calibratable threshold time ($t_{THR}$) (e.g., 500 ms). If t is not equal to or greater than $t_{THR}$, control loops back to step 306. If t is equal to or greater than $t_{THR}$, control continues in step 312.

Control resets t equal to zero in step 312. In step 314, control sets the EGR mode to ON. In step 316, control monitors $P_m$, RPM, $T_m$, $\dot{M}_{MAF}$ and $\dot{M}_{CylAir}$. Control increments t in step 318. In step 320, control determines whether t is equal to or greater than $t_{THR}$ (e.g., 500 ms). If t is not equal to or greater than $t_{THR}$, control loops back to step 316. If t is equal to or greater than $t_{THR}$, control continues in step 322. In step 322, control determines $\overline{P}_m$, $\overline{RPM}$, $\overline{T}_m$ $\overline{\dot{M}}_{MAF}$ and $\overline{\dot{M}}_{CylAir}$ for the EGR OFF monitoring period. In step 324, control determines $\overline{P}_m$, $\overline{RPM}$, $\overline{T}_m$ $\overline{\dot{M}}_{MAF}$ and $\overline{\dot{M}}_{CylAir}$ for the EGR ON monitoring period.

Control calculates $\dot{M}_{EGRON}$ and $\dot{M}_{EGROFF}$ for the EGR ON and EGR OFF monitoring periods, respectively, in step 326. In step 328, control determines $\overline{\dot{M}}_{EGR}$ based on $\dot{M}_{EGRON}$ and $\dot{M}_{EGROFF}$. Control updates the $\overline{\dot{M}}_{EGRFILT}$ in step 330. In step 332, control determines whether the $\dot{M}_{EGRFILT}$ is less than $\dot{M}_{EGRTHR}$. If the $\dot{M}_{EGRFILT}$ is less than $\dot{M}_{EGRTHR}$, control signals a fault in step 334 and control ends. If the $\dot{M}_{EGRFILT}$ is not less than $\dot{M}_{EGRTHR}$, control signals a pass in step 336 and control ends.

Figure 4:
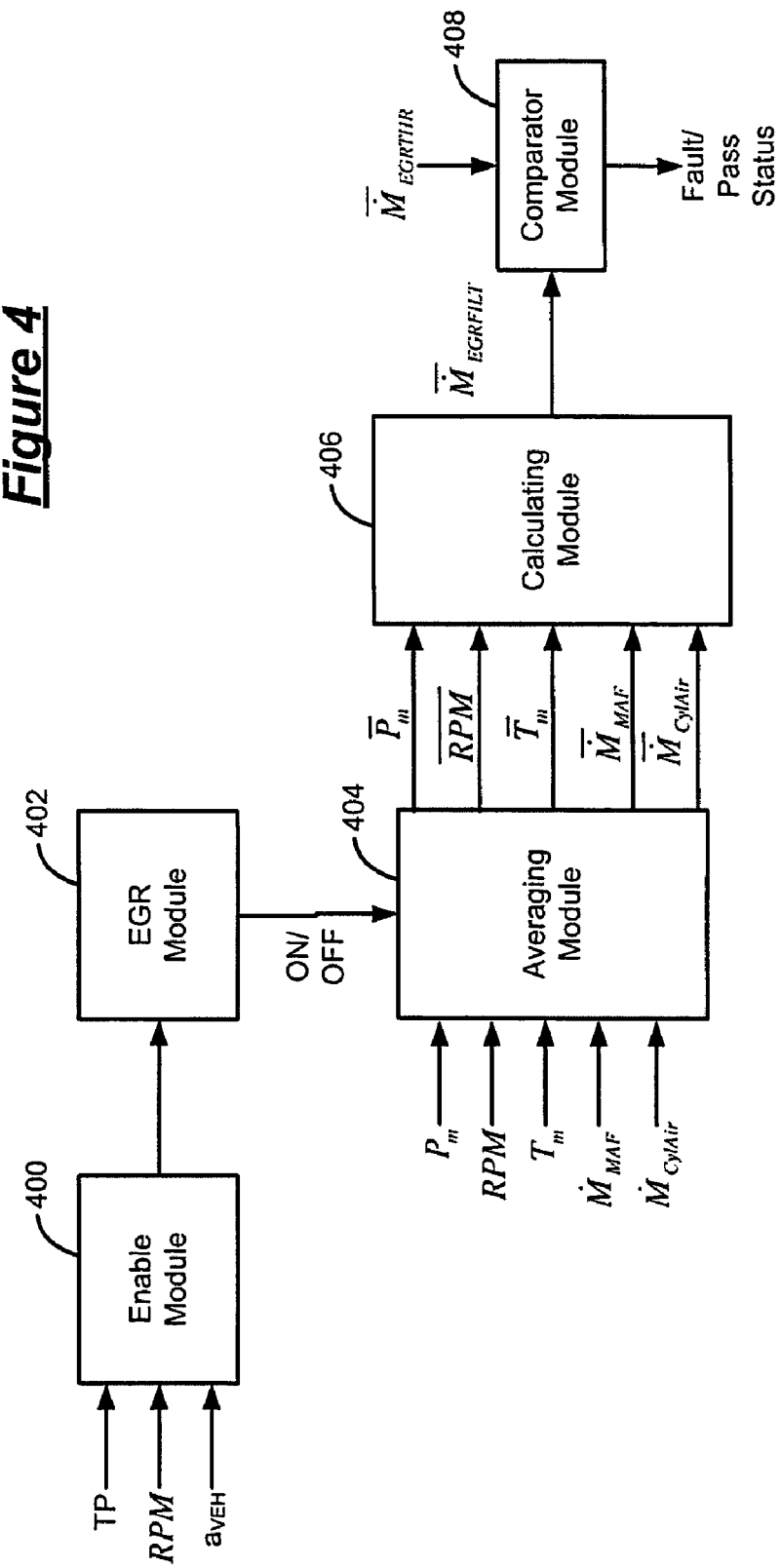
FIG. 4 is a signal flow diagram illustrating exemplary modules that execute the EGR flow restriction control of the present invention.

Referring now to FIG. 4, exemplary modules that execute the EGR flow restriction control of the present invention are illustrated. The modules include an enable module 400, an EGR module 402, an averaging module 404, a calculating module 406 and a comparator module 408. The enable module 400 receives a throttle position (TP) signal, a vehicle acceleration ($a_{VEH}$) signal and the RPM signal and generates an enable signal based thereon to selectively enable the EGR flow restriction test control. The EGR module 402 switches the EGR system between the ON and OFF modes while the EGR flow restriction control is enabled.

The averaging module 404 receives the $P_m$, RPM, $T_m$, $\dot{M}_{MAF}$ and $\dot{M}_{CylAir}$ signals and determines their respective averages (i.e., $\overline{P}_m$, $\overline{RPM}$, $\overline{T}_m$ $\overline{\dot{M}}_{MAF}$ and $\overline{\dot{M}}_{CylAir}$) for both the EGR OFF and EGR ON monitoring periods. The calculating module 406 calculates $\dot{M}_{EGR}$ based on the signal averages for both the EGR ON and EGR OFF monitoring periods and then calculates $\dot{M}_{EGRFILT}$. The comparator module 408 generates a fault or pass status based on $\dot{M}_{EGRFILT}$ and $\dot{M}_{EGRTHR}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system that monitors flow restriction through an exhaust gas recirculation (EGR) system of an engine, comprising:
 a first module that calculates a test EGR mass flow rate based on a first average EGR mass flow rate when said EGR system is in an EGR OFF mode and a second average EGR mass flow rate when said EGR system is in an EGR ON mode; and
 a second module that selectively generates a fault signal based on said test EGR mass flow rate.

2. The engine control system of claim 1 wherein said second module generates said fault signal when said test EGR mass flow rate is less than a threshold EGR mass flow rate.

3. The engine control system of claim 1 further comprising an enable module that selectively generates an enable signal, wherein said first module calculates said first and second average EGR mass flow rates based on said enable signal.

4. The engine control system of claim 1 wherein said first module monitors a manifold absolute pressure, an engine speed, a manifold temperature a mass air flow into an intake manifold and a mass air flow into cylinders during operation of said engine in said EGR OFF mode and calculates said first average EGR mass flow rate based thereon.

5. The engine control system of claim 4 wherein said first module calculates said first average EGR mass flow rate based on averages of said manifold absolute pressure, said engine speed, said manifold temperature, said mass air flow into said intake manifold and said mass air flow into said cylinders over operation of said engine in said EGR OFF mode.

6. The engine control system of claim 1 wherein said first module monitors a manifold absolute pressure, an engine speed, a manifold temperature, a mass air flow into an intake manifold and a mass air flow into cylinders during operation of said engine in said EGR ON mode and calculates said second average EGR mass flow rate based thereon.

7. The engine control system of claim 6 wherein said first module calculates said second average EGR mass flow rate based on averages of said manifold absolute pressure, said engine speed, said manifold temperature, said mass air flow into said intake manifold and said mass air flow into said cylinders over operation of said engine in said EGR ON mode.

8. A method of monitoring flow restriction through an exhaust gas recirculation (EGR) system of an internal combustion engine, comprising:
 calculating a test EGR mass flow rate based on a first average EGR mass flow rate when said EGR system is in an EGR OFF mode and a second average EGR mass flow rate when said EGR system is in an EGR ON mode; and
 generating a fault signal based on said test EGR mass flow rate.

9. The method of claim 8 wherein said fault signal is generated when said test EGR mass flow rate is less than a threshold EGR mass flow rate.

10. The method of claim 8 further comprising generating an enable signal, wherein said first and second average EGR mass flow rates are calculated based on said enable signal.

11. The method of claim 8 wherein further comprising:
 monitoring a manifold absolute pressure, an engine speed, a manifold temperature, a mass air flow into an intake manifold and a mass air flow into cylinders during operation of said engine in said EGR OFF mode; and
 calculating said first average EGR mass flow rate based thereon.

12. The method of claim 11 wherein said first average EGR mass flow rate is calculated based on averages of said manifold absolute pressure, said engine speed, said manifold temperature, said mass air flow into said intake manifold and said mass air flow into said cylinders over operation of said engine in said EGR OFF mode.

13. The method of claim 8 further comprising:
monitoring a manifold absolute pressure, an engine speed, a manifold temperature, a mass air flow into an intake manifold and a mass air flow into cylinders during operation of said engine in said EGR ON mode; and
calculating said second average EGR mass flow rate based thereon.

14. The method of claim 13 wherein said second average EGR mass flow rate is calculated based on averages of said manifold absolute pressure, said engine speed, said manifold temperature, said mass air flow into said intake manifold and said mass air flow into said cylinders over operation of said engine in said EGR ON mode.

15. A method of monitoring performance of an exhaust gas recirculation (EGR) system that re-circulates exhaust into an intake manifold of an internal combustion engine, comprising:
generating an enable signal;
calculating a test EGR mass flow rate based on a first average EGR mass flow rate when said EGR system is in an EGR OFF mode and a second average EGR mass flow rate when said EGR system is in an EGR ON mode based on said enable signal; and
generating a fault signal based when said test EGR mass flow rate is less than a threshold EGR mass flow rate.

16. The method of claim 15 wherein said enable signal is based on at least one of an engine speed, a throttle position and a vehicle acceleration.

17. The method of claim 15 wherein further comprising:
monitoring a manifold absolute pressure, an engine speed, a manifold temperature, a mass air flow into an intake manifold and a mass air flow into cylinders during operation of said engine in said EGR OFF mode; and
calculating said first average EGR mass flow rate based thereon.

18. The method of claim 17 wherein said first average EGR mass flow rate is calculated based on averages of said manifold absolute pressure, said engine speed, said manifold temperature, said mass air flow into said intake manifold and said mass air flow into said cylinders over operation of said engine in said EGR OFF mode.

19. The method of claim 15 further comprising:
monitoring a manifold absolute pressure, an engine speed, a manifold temperature, a mass air flow into an intake manifold and a mass air flow into cylinders during operation of said engine in said EGR ON mode; and
calculating said second average EGR mass flow rate based thereon.

20. The method of claim 19 wherein said second average EGR mass flow rate is calculated based on averages of said manifold absolute pressure, said engine speed, said manifold temperature, said mass air flow into said intake manifold and said mass air flow into said cylinders over operation of said engine in said EGR ON mode.

* * * * *